No. 782,246. PATENTED FEB. 14, 1905.
H. H. HILL.
BOOK.
APPLICATION FILED MAY 31, 1904.
2 SHEETS—SHEET 1.
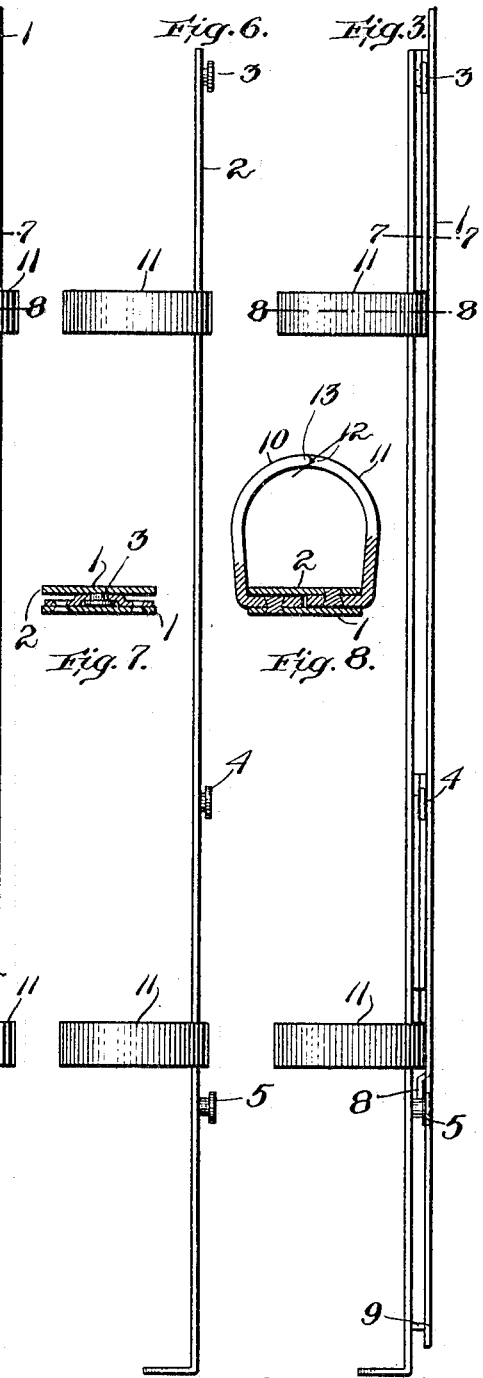

No. 782,246. PATENTED FEB. 14, 1905.
H. H. HILL.
BOOK.
APPLICATION FILED MAY 31, 1904.
2 SHEETS—SHEET 2.
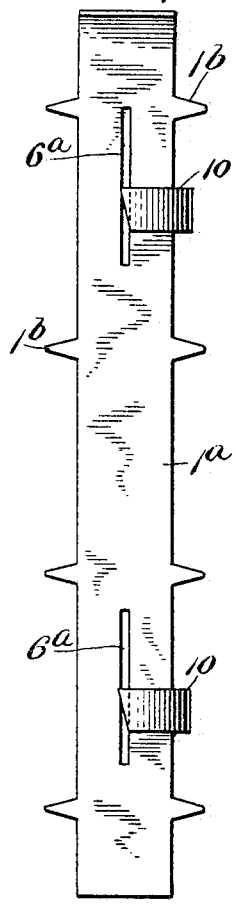
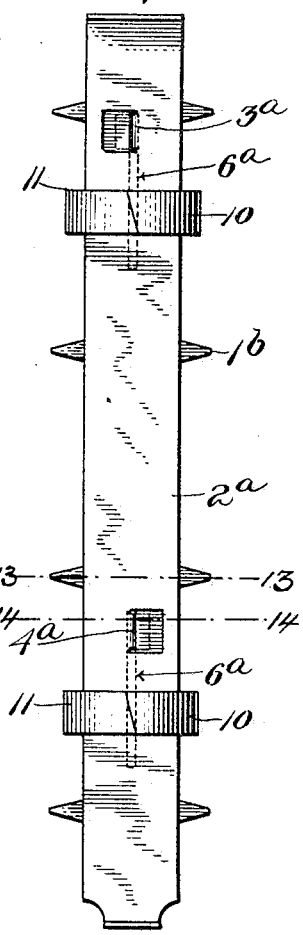
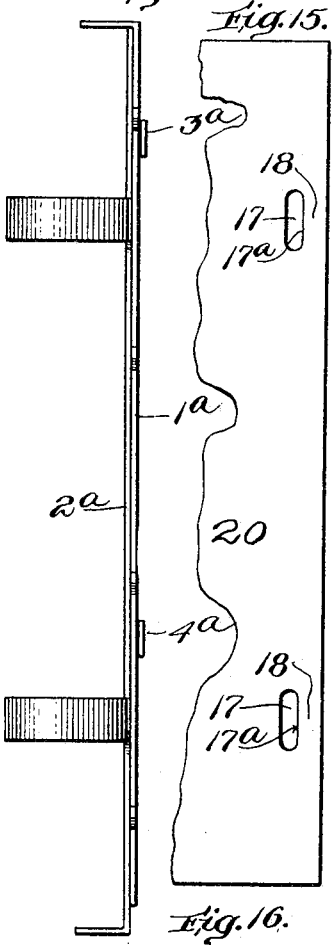
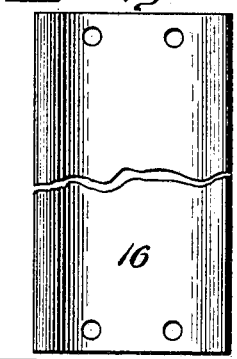
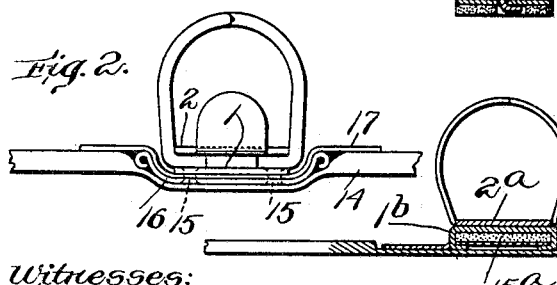
Witnesses:
Joseph T. Brennan
Margaret A. Danker
Inventor:
Horace H. Hill,
by Roberts & Mitchell
Attorneys No. 782,246. Patented February 14, 1905.

UNITED STATES PATENT OFFICE.

HORACE H. HILL, OF SOMERVILLE, MASSACHUSETTS, ASSIGNOR OF ONE-HALF TO FRANK L. SWEETSER, OF MELROSE, MASSACHUSETTS.

BOOK.

SPECIFICATION forming part of Letters Patent No. 782,246, dated February 14, 1905.

Application filed May 31, 1904. Serial No. 210,338.

*To all whom it may concern:*

Be it known that I, HORACE H. HILL, a citizen of the United States, and a resident of Somerville, in the county of Middlesex and State of Massachusetts, have invented new and useful Improvements in Books, of which the following is a specification.

My invention relates to book construction, and particularly to loose-leaf ledgers of that class in which slides carrying hooks are provided, which by the relative movement of the slides can be thrown together to form loops for engaging perforations in the leaves or thrown apart to open the loops for the removal or insertion of leaves.

My improved loose-leaf ledger comprises a leaf-holder made up of two hook-carrying members connected with provision for limited relative movement. Each member carries one or more (preferably two) hooks, the hooks of one member being opposed to the hooks of the other member, so that when the two members occupy their closed positions the two sets of hooks meet or register and form two leaf-engaging loops, and when the two members occupy their open positions the hooks are separated to permit the insertion or removal of the leaves. This construction is very much stronger, so far as tearing out the leaves is concerned, than has been the case with the round hook engaging a round perforation, as heretofore.

In the best form of my invention the two members of the leaf-holder consist of what may be termed a "fixed" member suitably fastened to the cover of the book and a movable member consisting of an endwise-movable slide mounted upon and connected with the fixed member, so that when the slide is shifted on the fixed member the hooks are moved sidewise relatively to open and close the loops. The free end of each hook, both of the slide and the fixed member, terminates in a diagonal edge, and the diagonal edges of the hooks of the slide are parallel with those of the fixed member, so as to close against the latter and provide a closed joint diagonal with relation to the leaves, whereby the latter are prevented from working through the joint. By this construction only two light members are required and heavy and intricate working parts are dispensed with.

Other features of my invention are hereinafter pointed out.

In the accompanying drawings, Figure 1 is a plan view of the leaf-holder of my improved loose-leaf ledger. Fig. 2 is an end view of the holder shown in Fig. 1, showing also a portion of the back of the ledger. Fig. 3 is a side view of the holder shown in Fig. 1. Fig. 4 is a plan view of the fixed member of the holder shown in Fig. 1. Fig. 5 is a plan view of the sliding member of the holder shown in Fig. 1. Fig. 6 is a side view of the sliding member or slide. Figs. 7 and 8 are respectively sections taken on lines 7 7 and 8 8 of Figs. 1 and 3. Fig. 9 is a plan view of another form of holder. Fig. 10 is a side view of the holder shown in Fig. 9. Fig. 11 is a plan view of the fixed member of the holder shown in Figs. 9 and 10. Fig. 12 is a plan view of the filler-strip hereinafter described. Figs. 13 and 14 are sections, respectively, on the lines 13 13 and 14 14 of Figs. 9 and 10. Fig. 15 shows a portion of my new ledger-leaf. Fig. 16 is a plan view, partly broken away, of the trough hereinafter described.

Having reference to the drawings, 1 represents the fixed member of the holder of my improved loose-leaf ledger, and 2 the slide. Each of these two members is herein shown as made from a strip of sheet metal. The slide 2 is provided upon its under side with three headed or T-shaped lugs 3, 4, and 5, lugs 3 and 4 engaging, respectively, with longitudinal slots 6 and 7, provided upon the upper face of the fixed members 1, while the lug 5 coöperates with two stops 8 and 9, provided on member 1 to limit the movement of slide 2 in both directions. These stops 8 and 9 are made by cutting member 1 so as to form tongues that are turned up into position above the plane of the top of member 1 so as to be engaged by lug 5. The stop 8 is undercut—that is, after the tongue of which it is formed is turned upwardly the end of the tongue is bent laterally parallel with member 1, and this laterally-extending end is situated far enough above the plane of the top of member 1 to provide room for the head or flange of lug 5 to pass thereunder. Thus when slide 2 occupies its innermost position and lug 5 is in engagement with stop 8 that end of slide 2 is held securely in position against member 1.

Riveted or otherwise suitably fastened to the top of member 1 is a pair of hooks 10, each made from a strip or band of sheet metal, so as to present a broad flat surface upon its inner side. The slide 2 is likewise provided with a pair of hooks 11, opposed to the hooks 10 of member 1; but these hooks 11 are fastened to the under side of slide 2. When slide 2 occupies its innermost position, the hooks thereof are directly opposite the hooks of member 1 and coöperate therewith to form two closed leaf-engaging loops, as shown in Fig. 8. In order to prevent relative movement of the ends of the opposed hooks under pressure upon the outer side of a hook exerted crosswise of the holder, the end of each hook 11 is made with a V-shaped notch 12, Fig. 8, to receive the end of its coöperating hook 10, which is rounded, as at 13, Fig. 8, to fit into said notch 12. This interlocking of the end of one hook with the end of the other prevents relative displacement of said ends under sidewise pressure on either hook. The rough manner in which a book of this kind is handled makes this interlocking feature of my invention important, because otherwise the ends of two coöperating hooks are liable to be displaced and the leaves of the book to escape from the loops.

Another feature of my invention consists in making the free ends of the hooks of each pair diagonal and in having the diagonal end of one hook parallel with the diagonal end of its coöperating hook, as shown in Fig. 1. This disposes the joint between the two hooks diagonally with relation to the plane of the leaves, so that the latter cannot pass through this joint without being bent or buckled at two points. Such bending or buckling, however, is wholly unlikely to occur accidentally under conditions of ordinary use. In this way when the loops are closed the leaves are securely confined within the same and cannot accidentally escape.

The leaf-holder made as above described is fastened by rivets 15 within a trough 16, a strip of canvas 17 being interposed between said parts when they are assembled. This strip of canvas is wider than trough 16 and has its edges cemented or otherwise suitably fastened to a cover 14, with the holder and trough at the hinge of said cover. The trough 16 thus not only serves as a strong anchorage for the rivets, but also serves to support the sides of the cover near the hinge thereof in the same plane with the top of slide 2 when the book is opened, so that the leaves are held evenly and it is convenient to write upon them.

Figs. 9 to 14, inclusive, illustrate another form of holder which is particularly adapted to books of small size. With this form of my invention each member with its two hooks is struck from one piece of sheet metal and the hooks afterward bent up into proper position. The fixed member $1^a$ of this form is also made with two longitudinal slots $6^a$, through which extend lugs $3^a$ and $4^a$, formed integral with the sliding member $2^a$. The lugs are made by cutting member $2^a$ so as to form tongues, which are bent perpendicularly to slide $2^a$ to extend through the slots $6^a$ and then laterally at their ends to provide heads for engaging the under side of the fixed member to hold the slide in place. Fingers $1^b$ are provided on member 1, by which said member is fastened to the back $14^a$, as shown in Fig. 13. Owing to the presence upon the under side of member $1^a$ of the ends of lugs $3^a$ and $4^a$, a filler-strip $15^a$ is employed, which is slotted, as at $15^b$, Fig. 12, to permit of free movement of said lugs. This strip is placed immediately against the under side of member $1^a$ and upon a canvas strip $16^a$, through which the fingers $1^b$ are driven and afterward clenched, so as to fasten said canvas strip and filler to member $1^a$. Afterward the canvas strip is cemented to the back $14^a$ and the book is complete.

The leaf 20, which forms part of my improved book, is made, as shown in Fig. 15, with two perforations 17, which are peculiar in that each is a slot and has a straight edge parallel with the adjacent edge of the leaf. The straight edges $17^a$ are adapted to fit throughout their length against the inner flat side of the hooks 10 and 11. Therefore a pull upon the leaf is resisted by a strip 18, which separates the slot 17 from the adjacent edge of the leaf, and the pressure of the hook upon this strip is resisted by the strength of the material at each end of said strip 18. It follows, therefore, that the strain is so distributed that in order to tear the leaf out of the holder the hook must sever the strip 18 at or near the middle or at one or the other ends of strip 18; but it is to be observed that the strain being distributed upon both ends of strip 18 each end will have to bear less strain under ordinary conditions than if the whole strain were concentrated at a single point, as with the old form of round hook and perforation. The flat-sided perforation and the flat-sided hook are therefore features of my invention which are of practical importance and value.

What I claim is—

1. In a leaf-holder, in combination two hook-carrying members arranged parallel one alongside the other; opposed hooks on said members organized to meet end to end when in their closed positions to form one or more leaf-holding loops each disposed in a plane crosswise of the holder, and means connecting the two members with provision for sliding one member endwise on the other in a straight path perpendicular to the plane of the loops so as to shift the hooks relatively sidewise.

2. In a leaf-holder, in combination, two hook-carrying members arranged parallel one alongside the other; opposed hooks on said members organized to meet end to end and overlap when in their closed positions to form leaf-holding loops each disposed in a plane crosswise of the holder, and means connecting the two members with provision for sliding one member endwise on the other in a straight path perpendicular to the plane of the loops so as to shift the hooks relatively sidewise.

3. In a leaf-holder, in combination, two hook-carrying members arranged parallel one alongside the other; opposed hooks on said members made with diagonal and parallel ends, said hooks being organized to meet when in their closed positions to form one or more leaf-holding loops each disposed in a plane crosswise of the holder, and means connecting the two members with provision for sliding one member endwise on the other in a straight path perpendicular to the plane of the loops so as to shift the hooks relatively sidewise.

4. A leaf-holder comprising a fixed member made with a pair of inwardly-arched hooks; a movable member made with a pair of inwardly-arched hooks opposed to those of the fixed member and arranged to register with the latter to form leaf-engaging loops when the movable member occupies one position, and a lug on one of said members engaging a longitudinal slot on the other member to connect said members with provision for relative endwise movement in a straight path perpendicular to the plane of the loops so as to shift the hooks relatively sidewise.

5. A leaf-holder comprising a fixed member made with a pair of inwardly-arched hooks; a movable member made with a pair of inwardly-arched hooks adapted to register with the hook of the fixed member to form leaf-engaging loops when the movable member occupies one position; a pair of headed lugs on one member engaging a pair of longitudinal slots on the other member to hold said members together with provision for relative movement; a third headed lug on one of said members, and a pair of stops on the other member one of which is undercut to engage the head of said lug to hold the two members together.

6. In combination two connected and relatively movable members, opposed hooks fixed to said members organized to register and form leaf-engaging loops when the members occupy their closed position; a hinged cover; a trough within which the fixed member is fastened, and means fastening the trough to said cover at the hinge of the latter.

Signed by me at Boston this 26th day of May, 1904.

HORACE H. HILL.

Witnesses:
ARTHUR F. RANDALL,
JOSEPHINE H. RYAN.